United States Patent [19]

Brown

[11] Patent Number: 4,691,412
[45] Date of Patent: Sep. 8, 1987

[54] BIVALVE MOLLUSK SHUCKER

[76] Inventor: Oswald Brown, Frenchman's Cove, Bay of Islands, Newfoundland, Canada, A0L 1E0

[21] Appl. No.: 752,845

[22] Filed: Jul. 8, 1985

[51] Int. Cl.$^4$ .............................................. A22C 29/04
[52] U.S. Cl. ...................................................... 17/74
[58] Field of Search .............................. 17/74, 71, 76

[56] References Cited

U.S. PATENT DOCUMENTS

| | | | |
|---|---|---|---|
| 3,302,236 | 2/1967 | Harris | 17/71 |
| 3,320,631 | 5/1967 | Brown | 17/74 |
| 3,495,293 | 2/1970 | Tolley | 17/71 |
| 3,594,860 | 7/1971 | Nelson et al. | 17/74 X |
| 4,143,444 | 3/1979 | Cox | 17/74 |
| 4,361,933 | 12/1982 | Rodman et al. | 17/74 X |

Primary Examiner—Willie G. Abercrombie
Attorney, Agent, or Firm—Fetherstonhaugh & Co.

[57] ABSTRACT

A mollusk shucker suitable for use in shucking bivalve mollusks such as scallops, comprises a conveyor which is continuously driven through a loading station, a shell opening station, a first half-shell removal station, an eviscerating station, an edible muscle removal station and a second half-shell discharge station. A plurality of carriers are mounted on the conveyor and are adapted to support mollusks for movement through the shucker. A shell opening mechanism is located in the shell opening station. The shell opening mechanism includes a heater for heating the shell and suction nozzles for engaging the half-shells and moving them apart. The carriers are adapted to clamp the second half-shell after the shell has been opened. The first half-shell is separated from the second half-shell and thereafter the eviscerating mechanism is introduced to the second half-shell to eviscerate the mollusk leaving the edible muscle attached to the second half-shell. The edible muscle is then removed by means of a heater which is applied to the outer face of the second half-shell to relax the bond between the second half-shell and the edible muscle and thereafter a suction conduit is introduced to the second first half-shell to extract the edible muscle portion.

16 Claims, 10 Drawing Figures

BIVALVE MOLLUSK SHUCKER

This invention relates to mollusk shuckers. In particular, this invention relates to a mollusk shucker which is particularly well-adapted for use in shucking scallops.

PRIOR ART

Considerable difficulty has been experienced in shucking mollusks such as scallops, clams, and oysters and numerous different machines have been designed for this purpose.

One of the difficulties which has been experienced is that of providing a comprehensive mechanism which is capable of receiving a closed bivalve mollusk and proceeding to open the mollusk, remove one half-shell (valve), eviscerate while retaining the edible muscle and thereafter removing the edible muscle and subsequently ejecting the second half-shell. While several machines have been provided, these known machines are incapable of providing this desirable separation of the components of the mollusk.

A further difficulty which has been experienced is in attempting to provide a mechanism which is capable of a substantially completely eviscerating a molusk to separate the viscera from the edible muscle portion.

Another difficulty which has been experienced is in attempting to provide an efficient mechanism for opening mollusks prior to eviscerating. Various attempts have been used to provide heaters, which will open the mollusk by the application of heat thereto, however, heating of a mollusk is not any absolute guarantee to the fact that it will open. Thus mechanisms which rely exclusively on heating have a limited success in the opening of mollusks. Mechanisms which rely exclusively on mechanical movement of the two half-shells to achieve opening frequently cause splintering of one or other of the half-shells and the shell splinters can contaminate the edible muscle.

A further difficulty which has been experienced is in effectively detaching one half-shell from the other while ensuring that the edible muscle portion remains attached to a predetermined half-shell of the mollusk.

This difficulty has been overcome by the mechanism of the present invention by ensuring that heat is applied to a first half-shell of the mollusk to heat it to a temperature greater than the temperature of the second half-shell of the mollusk as the mollusk proceeds through the shell opening station. This has the effect of causing the muscle to relax its attachment to the heated half-shell such that when the shell is subsequently opened wide, the muscle has a greater attachment to the second half-shell than the first half-shell, with the result that the first half-shell can be detached from the second half-shell and discharged leaving the muscle and viscera attached to the second half-shell.

Difficulty has also been experienced in providing a mechanism which will permit the removal of the edible muscle without applying heat to the shell which is sufficient to discolour the edible muscle. I have found that this difficulty can be overcome by providing a heater which will apply sufficient heat to the shell of the mollusk to relax the bond formed between the mollusk and the shell and thereafter removing the mollusk by a suction nozzle which is inserted into the second half-shell to substantially surround the muscle and subjecting the muscle to a negative pressure tending to suck it away from its second half-shell.

SUMMARY OF INVENTION

According to one aspect of the present invention, a bivalve mollusk shucker comprises a mollusk shucker for use in shucking bivalve mollusks which have two half-shell portions connected at a hinge end by an edible muscle, and each half-shell having a distal end remote from the hinge end, comprising a conveyor mounted for movement in an endless path extending through a loading station, a shell opening station, a first half-shell removal station, an eviscerating station, an edible muscle removal station and a second half-shell discharge station, a plurality of mollusk carriers mounted on said conveyor, each carrier being adapted to support a mollusk with its plane of shell separation aligned with said endless path, shell opening means in said shell opening station, first half-shell separation means in said first half-shell removal station for removing the first half-shell from its carrier, eviscerating means in said eviscerating station for removing the inedible viscera from the second half-shell without removing the edible muscle, edible muscle removal means in said edible muscle removal station adapted to remove the edible muscle from said second half-shell and, release means in said second half-shell discharge station for discharging the second half-shell from its carrier.

According to a further aspect of the present invention, the eviscerating mechanism of a bivalve mollusk shucker comprises an eviscerating head having a suction chamber, a viscera inlet passage opening from the suction chamber, a viscera discharge passage opening from the suction chamber and communicating with a vacuum source to generate a negative pressure in said viscera inlet passage which serves to separate the viscera from the muscle, and, a water jet inlet opening into said viscera passage adapted to discharge a jet of water in a direction to impinge on the viscera and release it from the muscle in use, pressure relief valve means communicating with said suction chamber for limiting the negative pressure within said suction chamber to prevent removal of the muscle from the second half-shell, support means supporting said eviscerating head for movement with respect to successive mollusk carriers, said support means comprising means for mounting said eviscerating head for movement between an operative position in which the eviscerating inlet passage is in communication with a second half-shell located in said eviscerating station to locate the viscera inlet passage in a position substantially enclosing the muscle and viscera and an inoperative position in which eviscerating inlet passage is out of engagement with the second half-shell.

According to yet another aspect of the present invention, the mechanism for moving the eviscerating head of the eviscerator of a bivalve mollusk shucker according to the present invention comprises a carriage mounted to reciprocate longitudinally of said path between a retracted position and an advanced position, an arm mounted on said carriage for pivotal movement about an axis extending parallel to said path, said arm projecting laterally from said carriage, said eviscerating head being mounted on said arm for movement with said arm between said operative and inoperative positions in response to movement of said arm about its pivotal connection with said carriage between a first position and a second position, a cam follower mounted on said arm, an eviscerator cam track extending longitudinally of said eviscerator station, said eviscerator cam track having a forward run along which the cam follower travels during movement of the carriage from the retracted position to the advanced position, said forward run being shaped to cause the eviscerator head to sequentially move to, remain in and move away from said operative position in response to movement along said forward operative position in response to movement along said forward run and a return run along which the cam follower maintains the eviscerator head in the inoperative position.

According to a still further aspect of the present invention, there is provided a mollusk shucker wherein the mollusk carriers each comprise a frame member mounted on said conveyor, a seat formed in said frame member and opening outwardly therefrom for seating the hinge end of a bivalve mollusk, a side wall member arranged to extend from the seat to be disposed in an outwardly overlying relationship with respect to a second half-shell of a mollusk seated in said seat in use, a clamp having an inner jaw and an outer jaw defining an open mouth opening toward said seat, said clamp being slidably mounted with respect to said seat for movement between an open position in which the jaws are spaced from the seat a sufficient distance to be spaced outwardly from the distal ends of the half-shell of a mollusk seated in said seat and a closed position in which the distal end of the second half-shell of a mollusk is located within said open mouth to be retained in an open configuration with the inner jaw disposed between the distal ends of the two half-shells, and, means for moving the clamp relative to said seat between said open and closed positions in response to movement of the carriers through said loading and opening stations so as to be open when in the loading station and to move to the closed position during movement through the opening station.

According to a still further aspect of the present invention, there is provided a method of shucking bivalve mollusks which comprises the steps of supporting a mollusk on a carrier for movement through a shell opening station, a first half-shell removal station, an eviscerating station, an edible muscle removal station and a second half-shell discharge station, said mollusk being initially supported by providing an underlying support to the second half-shell thereof, while leaving the first half-shell unsupported so as to be free to move away from the second half-shell to an open position, heating the first half-shell to relax the muscle to at least reduce its degree of attachement to the first half-shell segment, physically engaging the first and second half-shells after said heating and moving the first half-shell to cause it to pivot about its hinged attachment to the second half shell to move it to an open position, mechanically clamping the second half shell to the carrier to hold it fast with respect to the carrier, mechanically deflecting the first half-shell to a wide open position thereby to separate the muscle from the first half-shell, arresting the movement of the first half-shell while continuing to drive the second half-shell through the first half-shell removal station to detach the first half-shell from the second half-shell and release it from its carrier, eviscerating the mollusk by confining the viscera and edible muscle in a vacuum chamber and subjecting it to a limited vacuum while simultaneously directing a jet of water against the viscera to flush the viscera away from the muscle, heating the second half-shell of the mollusk to weaken the attachment of the edible muscle to the second half-shell, sucking the edible muscle from the second half-shell and thereafter releasing the second half-shell from its carrier.

PREFERRED EMBODIMENT

The invention will be more clearly understood after reference to the following detailed specification read in conjunction with the drawings wherein.

Figure 1:
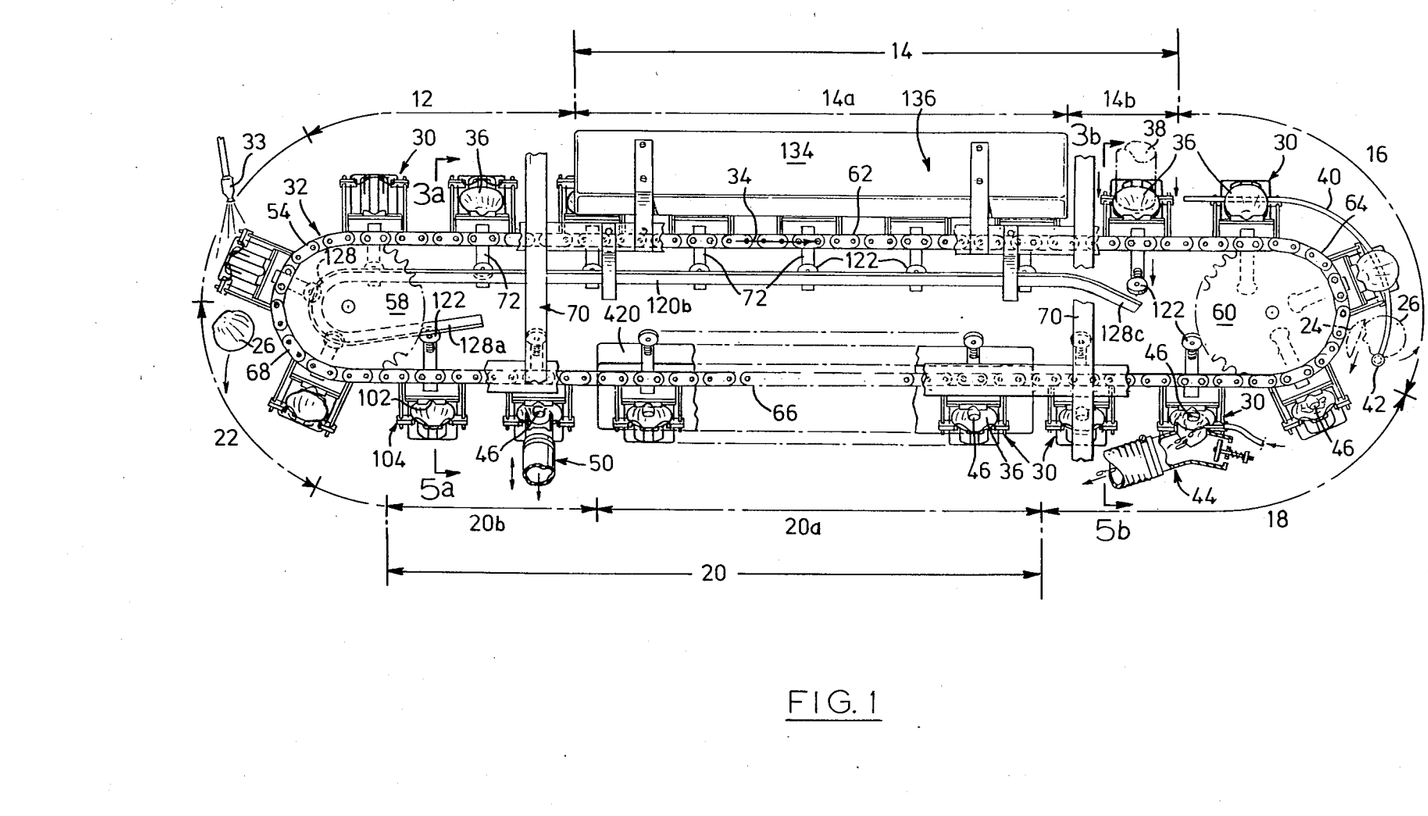
FIG. 1 is a side view of a mollusk shucker constructed in accordanced with an embodiment of the present invention.

With reference to FIG. 1 of the drawings, the reference numeral 10 refers generally to a bivalve mollusk shucker constructed in accordance with an embodiment of the present invention. The shucker 10 has a loading station 12, a shell opening station 14, a first half-shell removal station 16, an eviscerating station 18, an edible muscle removal station 20 and a second half-shell discharge station 22. The openingstation 14 has a heating section 14a and a mechanical opening section 14b. The edible muscle removal station 20 has a heating section 20a and a muscle removal section 20b.

GENERAL DESCRIPTION OF OPERATION OF MOLLUSK SHUCKER

As shown in FIG. 1 of the drawings, a plurality of mollusk carriers which are generally identified by the reference numeral 30 are mounted on a conveyor which is generally identified by the reference numeral 32 for movement in an endless path 34 which extends through the loading station 12, shell opening station 14, first half-shell removal station 16, eviscerating station 18, edible muscle removal station 20 and second half-shell discharge station 22 in series.

In the loading station 12, a bivalve mollusk 36 is mounted in a carrier 30 as will be described hereinafter. The carrier 30 transports the mollusk through the heating section 14a wherein heat is applied to the half-shell which is hereinafter described as the first half-shell so as to relax the bond between the muscle and the first half-shell. As the carrier 30 enters the mechanical opening section 14b, suction conduits generally identified by the reference numeral 38 (only one of which is shown) are applied to each half-shell and the second half-shell is mechanically clamped with respect to the carrier and the suction conduits 38 are moved away from one another to open the shell causing the first half-shell to pivot about its hinged connection with the second half-shell.

This mechanical opening occurs as the carrier and the mechanical opening mechanism are driven along the path 34. At the point of exit from the mechanical opening section 14b, a plow blade 40 is arranged to extend between the open half-shells. The plow blade 40 is laterally offset to further deflect the first half-shell away from the second half-shell to further open the mollusk and separate the muscle from the first half-shell. A stop 42 is located at the end of the plow blade 40 and serves to arrest the forward movement of the first half-shell while permitting continued movement of the second half-shell on its carrier. This serves to sever the first half-shell from the second half-shell. Thereafter, the second half-shell with the muscle and viscera attached is transported into the eviscerating station 18. In the eviscerating station 18, an eviscerating head 44 is operatively positioned to remove the inedible viscera. Thereafter, the second half-shell with the muscle 46 attached thereto is transported through a second heating section 20a in which heat is applied to the outer face of the second half-shell to relax the muscle 46. Thereafter, the edible muscle 46 is removed in section 20b by means of a muscle suction conduit 50. After removal of the muscle, the carriage 30 is opened to release the second half-shell which falls from the carrier under the influence of gravity as the carrier is driven around the arc of curvature of the conveyor.

BIVALVE MOLLUSKS

Figures 3, 4:
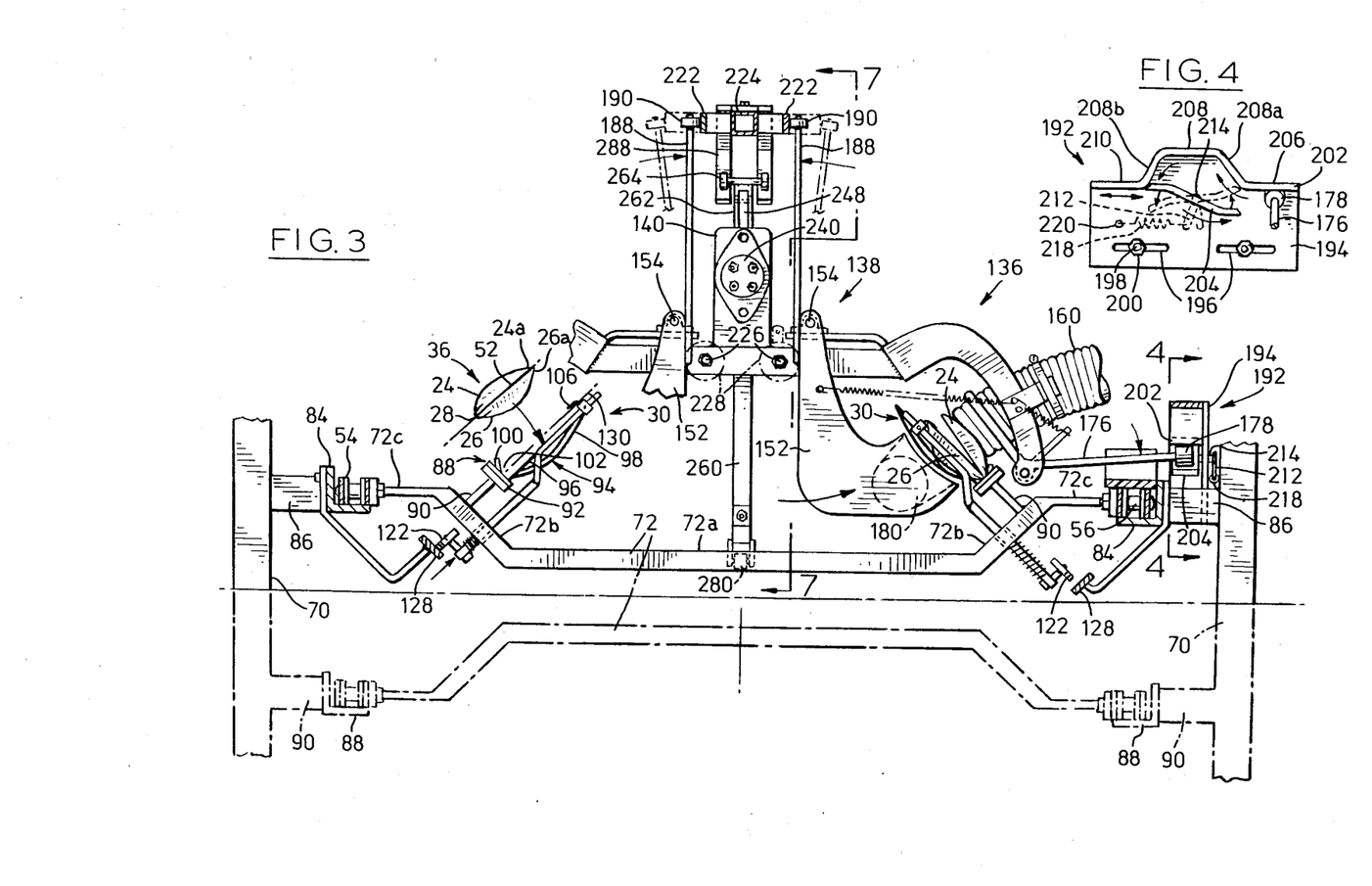
FIG. 3 is a section through the shucker of FIG. 1 showing on the left hand side, the loading station and on the right hand side, the shell opening mechanism.
FIG. 4 is a side view of a cam track used for controlling the operation of the shell opening mechanism taken in the direction of the arrow 4—4 of FIG. 3.

A bivalve mollusk 36 of the type which may be processed in the mollusk shucker 10 of the present invention is illustrated in FIG. 3 of the drawings. The mollusk 36 comprises a first half-shell 24 and a second half-shell 26 which are interconnected at a hinge end 28. The first and second half-shells 24 and 26 have distal ends 24a and 26a remote from the hinge end 28. The first and second half-shells 24 and 26 or valves as they are frequently called are generally tightly close along a plane of separation 52.

CONVEYOR

Figure 2:
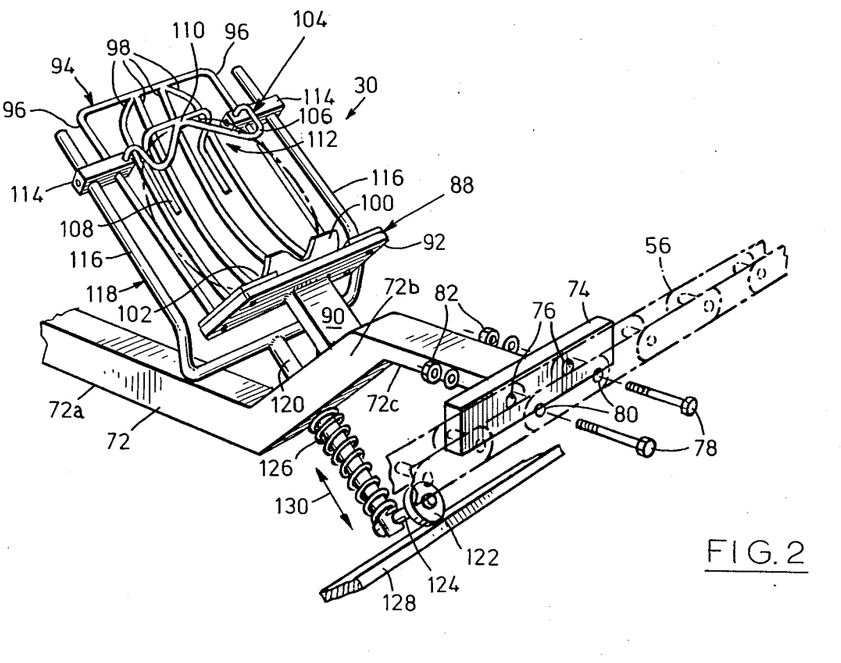
FIG. 2 is a pictorial view of a mollusk carrier.

The structure of the conveyor 32 is best illustrated in FIGS. 1, 2 and 3 of the drawings. The conveyor 32 comprises a pair of endless chains 54,56, each mounted on sprockets 58 and 60 which are vertically oriented such that the chains 54,56 have an upper forward run 62, first curved end run 64, a lower return run 66 and a second curved end run 68. The sprockets 58 and 60 are mounted by means of suitable bearings (not shown) on the main frame which is generally identified by the reference numerals 70 and are rotataby driven by means of a suitable drive motor (not shown) at a constant speed such that the carriers 30 are moved continuously through the various stations. The endless chains 54 and 56 extend in a spaced parallel relationship to one another and are interconnected by means of a plurality of crossbars 72. As shown in FIG. 2 of the drawings, the crossbars 72 have an end plate 74 formed with passages 76 extending therethrough. Bolts 78 extend through the passages 80 formed in the chain 56 and the passages 76 and are retained therein by means of locknuts 82. As shown in FIG. 3 of the drawings, the frame 70 has L-shaped guide rails 84 supported by brackets 86 so as to extend longitudinally of the upper forward run 62 so as to provide an underlying support for the chains 54 and 56 extending along the upper forward run 62. Similarly, L-shaped guide rails 88 are mounted on brackets 90 and provide an underlying support for the chains 54 and 56 as they extend along the lower return run 66.

The crossbars 72 have a central section 72a, a pair of angularly inclined end sections 72b and outer horizontally extending sections 72c.

MOLLUSK CARRIERS

The mollusk carrier 30 is best illustrated in FIGS. 2 and 3 of the drawings to which reference is now made.

The mollusk carrier 30 comprises a carrier frame generally identified by the reference numeral 88 which consists of a leg portion 90 which is welded to the angularly inclined end section 72b of the main frame 72. A base plate 92 is supported by the leg 90 and extends transversely thereof. A side wall member 94 of the carrier is in the form of a wire frame which has a pair of side rods 96 which are straight and extend parallel to one another and a plurality of inner wire rods 98 which extend in a shallow concave curvature which conforms generally to the concave curvature of the mollusk which is to be carried thereby. A lip 100 extends upwardly from the base plate 92 in a spaced relationship with respect to the side wall member 94 to define a mollusk seat 102 which is shaped to seat the hinge end of a bivalve mollusk.

In order to clamp the mollusk with respect to the carrier, a clamp which is generally identified by the reference numeral 104 is provided. The clamp 104 has an inner jaw 106 and an outer jaw 108 which are interconnected at their inner ends at a meeting point 110 and which diverge in a direction away from the meeting point 110 to form an open mouth 112 therebetween.

The clamp 104 is mounted on slides 114 which are slidably mounted on the side rods 96. The slides 114 are rigidly secured with respect to the fingers 116 of a fork-shaped member 118. The fork-shaped member 118 has a shaft 120 which is slidably mounted in the angularly inclined end section 72b of its associated crossbar 72. A cam follower 122 is mounted on a shaft 124 which is secured to the shaft 120. A compression spring 126 is mounted on the shaft 120 and has one end bearing against the shaft 124 and its other end bearing against the inclined end section 72b.

The cam follower 122 is against a cam track 128 variations in the path of which serve to move the shaft 126 to and fro in the direction of the arrow 130 thereby to move the clamp 104 between a closed position shown in FIG. 2 and an opened position shown in FIG. 3 in which it is spaced a sufficient distance from the seat 102 to permit the mollusk 36 to be seated with its hinge end 28 located in the seat 102 and its second half-shell 26 resting against the side wall member 94.

The mollusk carriers 30 are angularly inclined with respect to the vertical plane and arranged to open toward an adjacent side of the main frame 70 such that during passage of the carrier through the loading and opening stations, the mollusk may be supported therein by reason of the fact that the side wall member 94 provides an underlying support for the second half-shell 26 and the seat 102 provides an underlying support for the hinge end 28 of the mollusk. Thus, although the mollusk is not clamped by the clamp 104 during passage through the loading station and a major portion of the opening station, the mollusk will remain seated with its plane of separation 52 extending in the central plane 130 of the carrier 30.

MAIN GUIDE TRACK

The main guide track 128 serves as the means for moving the clamp 104 relative to the seat 102 between its open and closed positions. As shown in FIG. 1 of the drawings, the main guide track 128 has a first section 128a extending into the second half-shell discharge station 22. The section 128a is inclined toward the conveyor 32 and serves to move the clamp 104 to the open position to release a second half-shell as the carrier moves into and through the second half-shell discharge station 22. Thereafter, the main guide track 128 has a section 128b which extends parallel to the chain 32 and retains the clamp 104 in the open position during passage through the loading station and the heating section 14a. The main guide track 128a also includes an angularly inclined portion 128c which extends into the mechanical opening section and diverges with respect to the conveyor 32 such that during passage of the carrier 30 through the mechanical opening section, the clamp 104 will move to the closed position in which the inner jaw 106 will extend between the distal ends of an open mollusk and will thereby serve to retain the second half-shell fast in its associated carrier.

SHELL OPENING MEANS

The shell opening means is generally identified by the reference numeral 136 and comprises an infra-red gas heater 134 which extends longitudinally of the heating section 14a and is arranged to direct heat against the first half-shell 24 of a mollusk as it is driven through the heating section 14a. It will be noted that no heat is directed against the second half-shell. The heating section 14a functions as a muscle relaxing section in which the heat which is applied to the first half-shell section serves to relax the bond between the edible muscle and the first half-shell and may separate the first half-shell from the muscle. This frequently results in partial opening of the shell.

Figure 9:
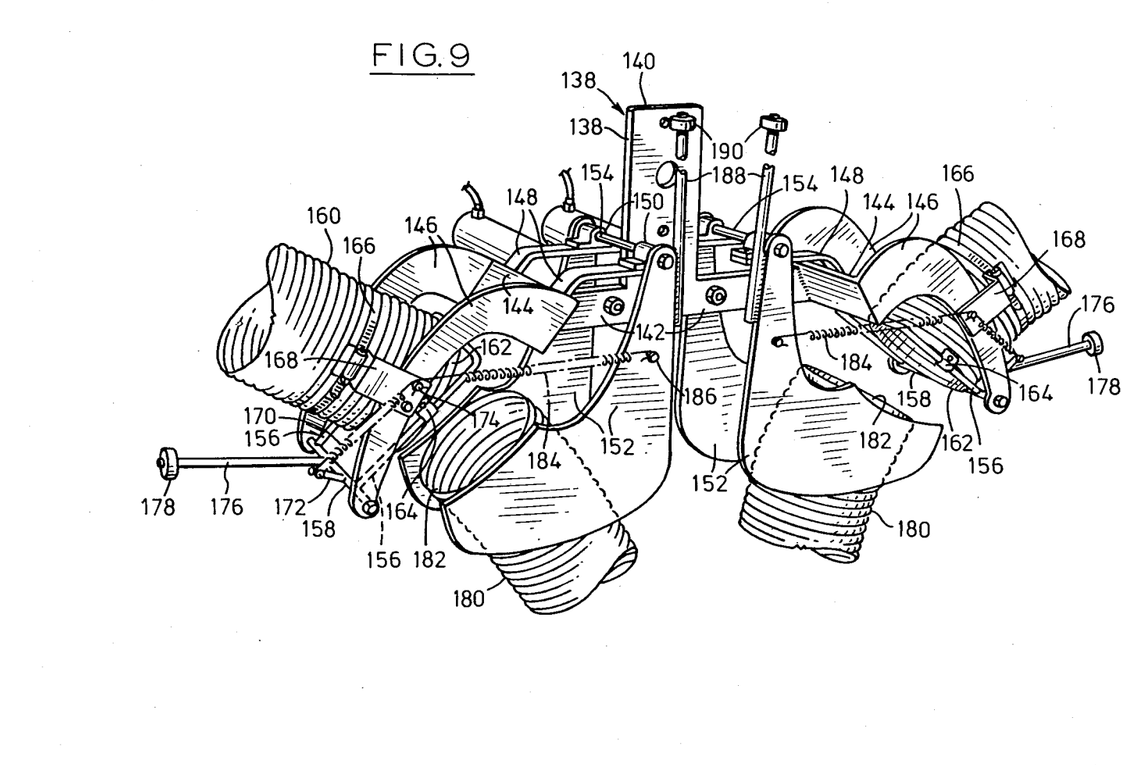
FIG. 9 is an enlarged detail view of the shell opening mechanism.

The shell opening mechanism 136 is best illustrated in FIGS. 3 and 9 of the drawings to which reference is now made.

Referring to FIG. 9 of the drawings, the reference numeral 138 identifies a carriage which moves to and fro along the mechanical opening section 14b (FIG. 1). The carriage 138 supports the mechanical opening mechanisms for both conveyors and is therefore symmetrical. The carriage 138 is in the form of a T-shaped plate 140 which has horizontal arms 142. An end plate 144 is located at the outer end of each arm 142 and a pair of curved first arms 146 extend outwardly one at each end of the end plate 144. Arms 148 extend inwardly from the end plate 144 and support bearings 152 at the inner end thereof. A pair of second arms 152 are mounted at opposite ends of a shaft 154 which is rotatable in the bearings 150. A frame 156 has a crossbar member 158 pivotally mounted at the outer ends of the curved arms 146. The conduits which are generally identified by the reference numeral 38 in FIG. 1, include a first conduit 160 and a second conduit 180. The first suction conduit 160 has its intake end 162 supported by brackets 164 which are secured to the frame 156 so as to open inwardly from the frame 156. A mounting band 166 is mounted on the first suction conduit 160 at a substantial distance rearwardly from the input end 162 thereof. The mounting band 166 is secured with respect to the arms 146 by means of mounting brackets 168. A first conduit 160 is longitudinally extendable and retractable so as to permit the intake end 162 thereof to move toward and away from the mounting band 166 in response to movement of the frame 156 about the axis of the crossbar 158.

A tension spring 170 has one end connected to an arm 172 which projects radially from the crossbar 158 and its other end connected to a pin 174 which is mounted on the bracket 168. This spring serves to urge the intake end 162 of the conduit 160 away from the mounting band 166. An arm 176 also extends radially from the crossbar 158 and has a cam follower 178 at its outer end.

The second suction conduit 180 has its intake end 182 held fast with respect to the outer ends of the second arms 152. The second conduit 180 and the first conduit 160 are both formed with bellows corrugations which permit extension and contraction of the length thereof. A tension spring 184 has one end secured to the pin 174 which is carried by the mounting brackets 168 and its other end connected to the pin 186 which is mounted on the second arm 152. The tension spring 152 serves to urge the intake end 182 of the second conduit toward the intake end 162 of the first conduit. The intake ends 162 and 182 are disposed opposite one another and arranged to be located one on each side of the central plane 130 of the carrier 30 as shown in FIG. 3 of the drawings. Each pair of second arms 152 has a shaft 188 projecting from the inner end thereof and a cam follower 190 is mounted at the outer end of each shaft 188.

The first and second conduits 160 and 180 communicate with a vacuum source (not shown) to generate a negative pressure at the intake ends thereof. The first and second suction conduits are caused to move such that the intake ends thereof move toward and away from a mollusk seated in a carrier located in the shell opening section by means of the movement of the cam follower 190 along the cam track generally identified by the reference numeral 192 in FIGS. 3 and 4 of the drawings. As shown in FIG. 4 of the drawings, the cam track 192 comprises an end plate 194 which has adjustment slots 196 extending longitudinally thereof through which mounting pins 198 which are secured with respect to the frame 70 extend and locknuts 200 which lock the end plate 194 in the required position. The camtrack includes a first cam rail 202 and a rocker arm 204.

The first guide rail 202 has a first horizontal portion 206 followed by a U-shaped portion 208 and a second horizontal portion 210. The rocker arm 204 is mounted on a shaft 214 which extends through the end plate 194. A lever arm 212 extends radially from the shaft 214. A tension spring 218 has one end connected to a mounting pin 220 and its other end connected to the lever arm 212 and serves to urge the rocker arm 204 to the position shown in solid lines in FIG. 4. As the carriage 138 is driven forwardly along the endless paths 34 as will be described hereinafter, the cam follower 178 moves to the left from the position shown in FIG. 4 of the drawings and travels along the first horizontal section 206 and thereafter along the U-shaped portion 208 thereafter along the second horizontal portion 210. When the follower 178 is travelling along the inclined section 208a, the arm 176 pivots upwardly and this action causes the intake end 164 of the first suction conduit to move toward the outer face of a first half-shell. The intake end of the first conduit 160 will remain in this forward position as the cam follower 178 travels along the base of the U-shaped section and this dwell period will provide sufficient time to enable the intake end of the conduit 160 to suctionally engage the first half-shell of the mollusk. Thereafter, movement along the second inclined portion 208b will cause the intake end of the conduit 162 to move away from its associated carrier 130 to the position shown in FIG. 3 of the drawings, thereby forcing the first half-shell 24 to move to the open position shown in FIG. 3.

It will be noted that in travelling between the inclined portion 208b and the horizontal portion 210 of the cam track 204, the cam follower 178 deflects the rocker arm 204 to the position shown in broken lines in FIG. 3. After the cam follower 178 moves away from the rocker arm 204, the spring 218 exerts itself in order to return the rocker arm 204 to the position shown in solid lines in FIG. 4.

After the shell has been opened as described above, the carriage 138 is driven back to the entrance of the mechanical opening section 14b. This has the effect of causing the cam follower 178 to travel along horizontal section 210 and then along the outer face of the rocker arm 204a which includes an inclined section 204a which serves to cause the intake end of the conduit 160 to move well clear of the path of travel along which the first half-shell of the incoming mollusk is driven when entering the mechanical opening section 14b. After passing the centre of the length of the rocker arm 204, the rocker arm will once again pivot to the position shown in broken lines in FIG. 4 to guide the cam follower 178 onto the horizontal portion 206.

The slots 196 serve to permit adjustment of the position of the cam track assembly 192 to ensure accurate operation thereof.

As previously indicated, the second arms 152 have a shaft 188 and cam follower 190 projecting upwardly therefrom. A cam follower 190 is driven along a cam track 222 (FIGS. 3 and 7) which is supported by a beam 224 which is carried by the main frame 70. A cam track 222 has a first section 222a and a second section 222b. When the followers located on the first section 222a, the second arms 152 will be spaced a substantial distance from the path of travel of the carriers 30 and when located on the section 222b, the second arms 152 will be located sufficiently closely adjacent a carrier to apply a substantial suction pressure to the outer surface of a second half-shell located therein.

RECIPROCATING DRIVE FOR CARRIAGE

Figures 7, 7A:
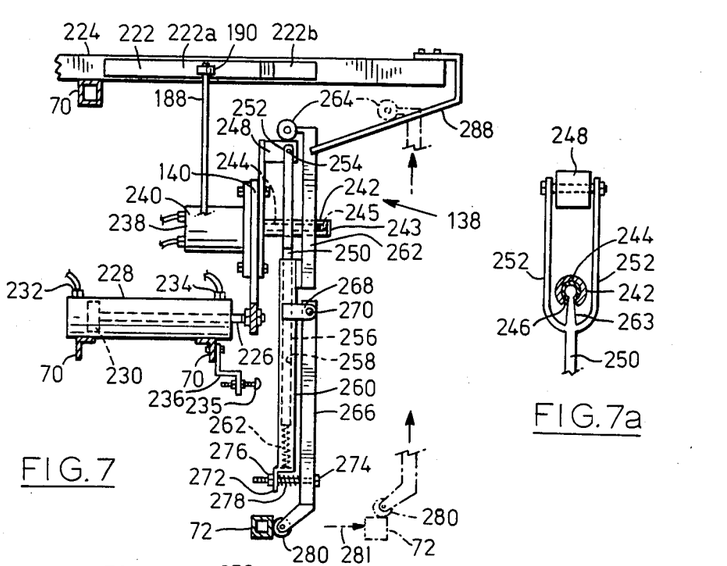
FIG. 7 is a sectional side view of the mechanism for transporting the shell opening mechanism taken in the direction of the arrows 7—7 of FIG. 3.
FIG. 7a is an enlarged sectional detail view of the connection between the four-way valve and its operating mechanism.

With reference to FIGS. 3, 7 and 9 of the drawings, it will be seen that the T-shaped plate 140 of the carriage 138 is mounted on the piston rods 226 which are slidably mounted in double acting hydraulic cylinders 228. A piston 230 is located at the inner end of each piston rod 226 and hydraulic fluid lines 232 and 234 communicate with the hydraulic cylinder 228 on opposite sides of the piston 230. The cylinders 228 are supported by main frame members 70. A bracket 236 is mounted on the frame 70 and supports an adjustable stop 235 which serves to arrest the movement of the slide member 260. The stop 235 arrests the movement of the slide member 260 which in turn communicates with a four-way valve 238 to de-activate the supply of hydraulic fluid to the fluid lines 232 and 234 when the end plate 140 is fully retracted. In the position shown in FIG. 7 of the drawings, the plate 140 is displaced slightly to the right of its fully retracted position.

A suitable four-way valve 238 is a modified four-way valve of the type manufactured by Ford Motor Co. for use as a power steering valve. This type of four-way valve 238 includes a main housing 240 and a slide housing 242. A valve stem 244 is slidably mounted in the stem housing 242 and an elongated slot 246 opens inwardly from the underside of the stem housing 242 to provide access to the stem 244. A compression spring 245 is located between the end of the valve stem 244 and the end 243 of the housing 244. By moving the stem 244 longitudinally to and fro of the stem housing 242, the four-way valve 240 may be moved sequentially between a forward, neutral and reverse operating positions which control the supply of hydraulic fluid to the cylinders 228.

An arm 248 projects outwardly from the T-plate 140 at the upper end thereof.

A Y-shaped member 250 has a pair of arms 252 located one on either side of the arm 248 and pivotally connected thereto by means of a pivot pinn 254. The leg portion 256 of the Y-shaped member is telescoped within a passage 258 which is formed in a slide member 260. A compression spring 262 is located in the passage 258 between the end of the leg portion 256 and the closed end of the slide member 260. The Y-shaped member 250 has a pin 263 which projects upwardly therefrom between the arms 252 and extends through the slot 246 into a seat 264 formed in the slide 244 such that movement of the Y-shaped member 250 about the pivot pin 254 will cause the slide member 244 of the four-way valve 238 to actuate the valve 238 as will be described hereafter.

The slide member 260 has an upper extension 262 which has a cam follower 264 mounted at its upper end. The slide 250 also has a lower extension 266 which is pivotally mounted on bracket 268 by means of a pivot pin 270. A bracket 272 is mounted at the lower end of the slide member 260. A bolt member 274 is mounted on the bracket 272 and has an adjustment nut 276 threaded thereon. The bolt 272 extends through the lower extension 266 and the head of the bolt 272 acts as a stop limiting movement of the lower extension 266 about the pivot pin 270. A compression spring 278 extends between the bracket 272 and the lower extension 266 and serves to urge the lower extension 266 to the extended position shown in FIG. 7 of the drawings. A cam follower 280 is mounted at the lower end of the lower extension 266.

A cam track 288 is mounted on the beam 224 in the path of travel of the cam 264 which is located at the upper end of the upper extension 261 of the slide member 260. The cam track 288 is upwardly inclined in the direction of forward movement of the carriage 138.

In the lowered position of the slide member 260 which is shown in FIG. 7 of the drawings, the lower cam follower 280 is located in the path of travel of the crossbars 72 which are driven through the mechanical opening section by means of the endless chains 54.

In use, the carriage 138 will assume the position illustrated in FIG. 7 of the drawings when at rest and out of contact with a crossbar 72. As the crossbar 72 is driven into the mechanical opening section 14b (FIG. 1) in the direction of the arrow 281, it will engage the follower 280. Initially, this movement will cause the Y-shaped member 250 to pivot about pivot pin 254. This movement will cause the upper extension 261 of the slide member 260 to move the valve stem 244 of the four-way valve 238 to an operative position to direct hydraulic fluid to the hydraulic fluid line 232 which will cause the piston 230 to move to the right to displace the entire carriage assembly 138 to the right. As a result of movement in this direction, the cam follower 264 will encounter the ramp 288 and will be driven up the ramp 288. Movement up the ramp 288 will raise the carriage 138 to the point illustrated in broken lines in FIG. 7 wherein the lower cam 280 is raised to a sufficient extent to permit the crossbar 72 to pass therebelow.

A spring 245 is located between the end of the valve stem 244 and the end of the slide housing 242. This spring 245 serves to normally urge the valve stem to the left in FIG. 7 to a position in which it will normally tend to direct hydraulic fluid to the conduit 234 to effect movement of the piston 230 to the left. Thus, when the cam follower 280 is raised out of engagement with the crossbar 72, the spring 245 will reassert itself to cause the valve stem 244 to move to the left to by-pass the valve neutral port position to activate the valve 240 to direct hydraulic fluid to the input line 234 of the cylinder 228. It will be apparent that movement of the stem 244 causes pivotal movement of the Y-shaped member 250 about pivot pin 254 returning it to its original position. The piston 230 will be driven to the left causing the entire carriage 138 to return to its original position until the slide member 260 contacts the adjustable stop 235. Continued movement of the stem housing 242 will cause the valve stem 242 to move to a position which serves to deactivate the supply of hydraulic fluid to the input line 234. During movement to the left, the spring 262 will reassert itself to cause the slide member 260 to move to its extended position to locate the cam follower 280 in the path of the next oncoming crossbar 72. This cycle of operation will be repeated by engagement with the next oncoming crossbar 72.

As the carriage 138 is returned to its original starting point, the slide member 260 contacts the stop and deactivates the power supply to the neutral port of the control valve and brings the carriage to rest.

It will be seen that as the carriage 138 is driven to and fro, the cam follower 190 of the arm 188 will be driven along the cam track 222 and as it approaches the section 222b, it will move inwardly to the position shown in solid lines in FIG. 3 thereby causing the arm 152 to move to a point closely adjacent the second half-shell 26 to apply a substantial suction pressure thereto which will serve to retain the second half-shell seated in the carrier until the inner jaw 106 (FIG. 2) is lowered into the gap between the open half-shells.

EVISCERATING AND SHUCKING MECHANISM

Figure 5:
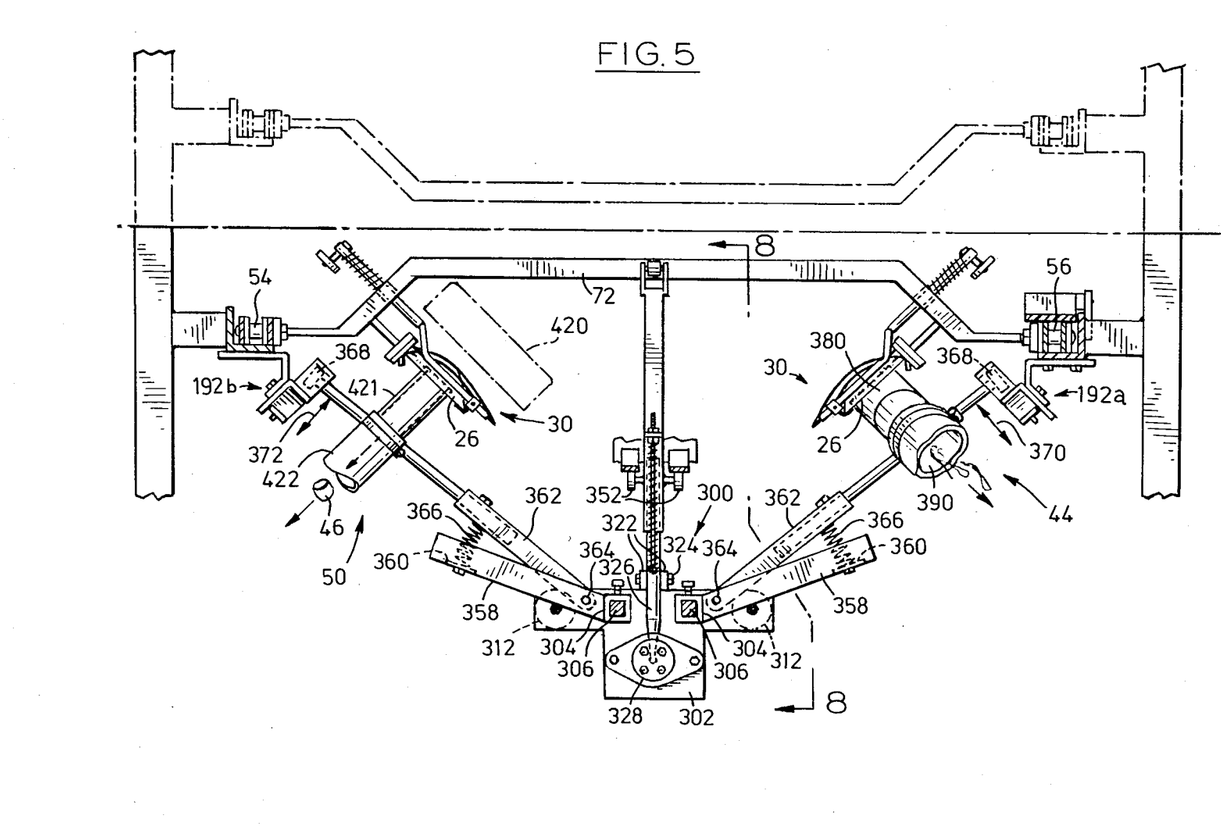
FIG. 5 is a cross-sectional view similar to FIG. 3 showing the eviscerating station and edible muscle removal station in the direction of the arrows 5A and 5B of FIG. 1.
Figure 8:
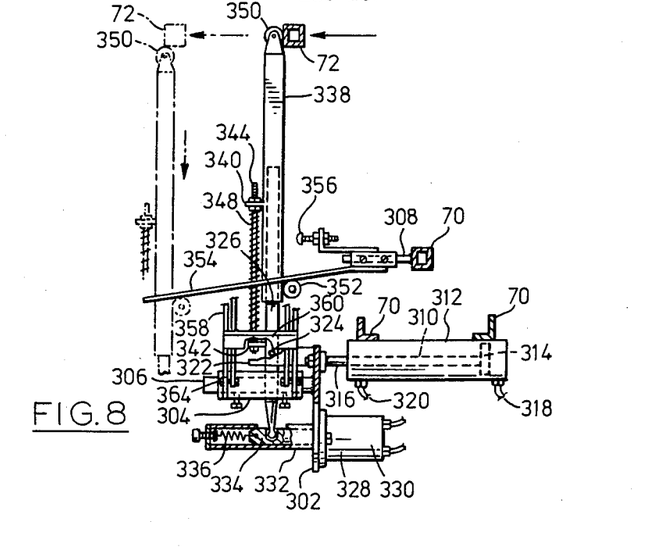
FIG. 8 is a sectional side view of the mechanism used for transporting the eviscerating mechanism taken in the plane 8—8 of FIG. 5.

The mechanism which activates the eviscerating head 44 and the muscle suction conduit 50 is best illustrated in FIGS. 5 and 8 of the drawings. For illustration purposes in FIG. 5 of the drawings, the eviscerating head 44 and muscle suction conduit 50 are shown as being mounted on a common carriage 300. It will be, however, understood that two such carriages and operating mechanisms are provided, one in the eviscerating station 18 (FIG. 1) and the other in the edible muscle removal section 20b.

Each carriage 300 comprises a T-shaped plate 302 which has rails 306 secured thereto and projecting forwardly therefrom. Tubular slide members 304 are slidably mounted on rails 306. A pair of hydraulic cylinders 312 are mounted on the frame 70. Each hydraulic cylinder 312 has a piston 314 slidably mounted therein. A piston 316 extends from the piston 314 and is connected to the T-shaped plate 302. Hydraulic fluid inlet lines 318 and 320 communicate with opposite sides of the piston 314. A pair of lugs 322 are mounted at the upper edge of the T-shaped plate 302 and project forwardly therefrom. A pivot pin 324 pivotally mounts a valve actuator arm 326 in the lugs 322.

A four-way valve 328 is mounted on the T-shaped plate 302 and has a main housing 330. A slide housing 332 projects forwardly from the main housing 330 and a valve stem 334 is mounted in the slide housing 332. A tension spring 336 is also mounted in the slide housing 332 and is operative to urge the valve stem 334 to move to the left of FIG. 8.

The leg 326 is telescoped within an extension 338. A bracket 340 is mounted on the extension 338 and a bracket 342 is mounted on the leg 326. A rod 344 is secured to the bracket 340 and extends through the bracket 342. The head 346 of the rod 344 bears against the outer face of the bracket 342. Compression spring 348 extends between the bracket 340 and the bracket 342 and serves to normally urge the extension 338 toward the fully extended position shown in solid lines in FIG. 8. A cam follower 350 is mounted at the outer end of the extension 338 in the path of travel of the crossbar 72. A further pair of cam followers 352 are mounted on the extension 338 and underlie cam tracks 354 which project forwardly and downwardly from the frame member 308.

In use, when the crossbar 72 engages the cam follower 350, the leg 326 and extension 338 are caused to pivot about the pivot point 324 which causes the valve stem 334 to move to the right of FIG. 8. This activates the valve 328 to cause hydraulic fluid to be directed to the inlet line 318 of the cylinder 310. This causes the piston 314 to move to the left and this in turn, causes the T-shaped plate 302 to move to the left. As the slide member 304 moves to the left, the cam follower 352 is driven down the cam track 354 compressing the spring 348 and causing the extension 338 to telescope with respect to the leg 326. This continues until the cam follower 350 is lowered to the position shown in broken lines in FIG. 8 wherein it is sufficiently low to permit the crossbar 72 to pass thereover. This permits the spring 336 to reassert itself and cause the valve stem 334 to move beyond the neutral valve port position and this in turn causes the supply of hydraulic fluid to be diverted to the inlet line 320 which serves to reverse the direction of movement to the piston 314. The piston 314 will then be returned to its starting position as will the T-shaped plate 302. As the T-plate 302 returns to its starting position, the extension 338 will be extended to its fully extended position by the force applied by the compression spring 348. When the slide extension 338 is fully retracted, the slide extension 338 engages the stop switch 356 which serves to interrupt the supply of hydraulic fluid to the cylinder 312. The cycle will then be repeated in response to engagement with the next following crossbar members 72. This mechanism serves to effect longitudinal reciprocal movement of the eviscerating head 44 and muscle suction conduit 50. The eviscerating head 44 and muscle suction conduit 50 must also be moved toward and away from the mollusk carriers 30.

As shown in FIGS. 5 and 8 of the drawings, a pair of fixed arms 358 project outwardly from the slide members 304. A bridge plate 360 extends between each pair of arms 358 adjacent the outer end thereof. A movable arm 362 is pivotally mounted on the fixed arms 358 by means of a pivot pin 364. A compression spring 366 extends between the bridge plate 360 and the movable arm 362 and normally urges the movable arm 362 upwardly away from the fixed arm 358.

The movable arm 362 has a cam follower 368 located at its outer end.

In the mechanism which is used for moving the eviscerator head 44, the eviscerator head 44 is mounted on the movable arm 362 adjacent the outer end thereof and moves with the arm 362 to and fro in the direction of the arrows 370. In the edible muscle removal station, the edible muscle suction conduit 50 is mounted on the arm 362 for movement to and fro in the direction of the arrows 372. Movement to and fro and the direction of the arrows 370 and 372 results from the movement of the cam followers 368 along the cam track assemblies 192a and 192b which are identical in construction to the cam track 192 and will not therefore be described in detail. It will, however, be understood that as a result of movement of the T-shaped plate 302 in the forward direction, the movable arm 362 will be caused to move initially toward a mollusk carrier 30 and thereafter away from its associated mollusk carrier 30 so as to be operably positioned to effect the required eviscerating action and the required muscle removal action.

EVISCERATING HEAD

Figure 6:
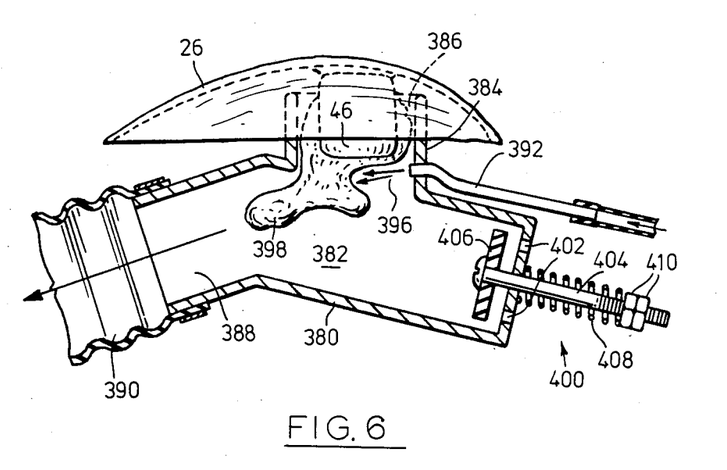
FIG. 6 is an enlarged detailed view of the eviscerating head of FIG. 1.

The structure of the eviscerating head is best illustrated in FIG. 6 of the drawings.

As shown in FIG. 6 of the drawings, the eviscerating head 44 comprises a housing 380 which is formed with a suction chamber 382. A tubular projection 384 is formed with a viscera inlet passage 386 which opens from the suction chamber 382. A viscera outlet passage 388 opens from the suction chamber 382 and communicates with a vacuum source through a flexible conduit 390. A water jet inlet conduit 392 opens through the wall of the tubular projection 384 and is arranged to discharge a jet of water 396 across the inner end of the inlet passage 384 in a direction toward the viscera outlet passage 388. The jet of water 396 is inclined at an acute angle with respect to the second half-shell 26 when in an operable position so as to impinge on the viscera 398 to flush it away from the edible muscle 46 and direct it toward the outlet passage 388.

To prevent removal of the edible muscle 46, a pressure valve 400 is provided. Vent passages 402 communicate with the suction chamber 382. A valve stem 404 is reciprocally mounted in the housing 380 and has a valve head 406 proportioned to close the vent passage 402 as required in use. A compression spring 408 is mounted on the shaft 404 and extends between the housing 380 and lock nuts 410. The compression spring 408 will yield to permit the valve head 406 to move to the open position venting the chamber 380 when an excessive negative pressure is generated in the vacuum chamber 382. By adjusting the position of the nuts 410, the preload applied to the spring 408 may be adjusted as required in use.

It will be noted that the tubular projection 384 is proportioned to project into the concave cavity formed in the second half-shell 26 to surround the edible muscle 46 and its associated viscera 398 in close proximity thereto. This ensures that a sufficient negative pressure can be generated within the chamber 382 to permit removal of the viscera and it also ensures that the water jet will impinge against the viscera 398 and serve to flush it away from its associated edible muscle. It will be noted that this eviscerating action takes place before the second half-shell is heated by the second heater 420.

MUSCLE SUCTION CONDUIT

The muscle suction conduit 421 comprises a rigid conduit which is connected to a flexible conduit 422 and is mounted on the arm 362 for movement therewith. The conduit 421 has a through passage communicating with the through passage of the conduit 422 and is movable into a position extending into the hollow cavity formed in the second half-shell 26 to surround the edible muscle 46. A sufficient negative pressure is applied to the edible muscle 46 to separate it from the second half-shell 26. It will be noted that before entering the edible muscle removal section, the second half-shell is heated by an infra-red heater 420 to relax the muscle to facilitate its removal.

SECOND HALF-SHELL REMOVAL

After the edible muscle has been removed, the carrier 30 enters the second half-shell removal station 22 (FIG. 1) at which point the cam follower 122 (FIG. 2) once again encounters the cam track 128 at the first inclined section 128a. As a result, the clamp 104 will begin to move away from the mollusk seat 102. Because the clamp is inverted in this position, the mollusk will fall away from the seat 102 so as to be supported by the open mouth 112. Once the carrier 30 moves to a horizontal position, the second half-shell 26 will fall freely from the carrier under its own weight. A jet of water is directed against the carrier by way of a nozzle 33 to ensure that the second half-shell 26 is ejected.

GENERAL DESCRIPTION OF OPERATION

In use, scallops are manually inserted, hinge down, into the open carriers 30 as they pass through the loading station 12. The scallops then pass along the heating section 14a of the shell opening section 14 wherein an infra-red heater 134 directs heat against the outer face of the first half-shell to relax the connection between the first half-shell and the muscle. In some instances, this heating may cause the first half-shell to open and separate from the edible muscle. When the carrier leaves the heating section 14a (FIG. 1), it enters the mechanical opening section 14b wherein the first suction conduit 160 and second suction conduit 180 suctionally engage the first and second half-shells respectively and are activated to move the first half-shell away from the second half-shell to open the shells to a sufficient extent to permit the inner jaw 106 of the clamp 104 to enter the space formed between the distal ends of the half shells 24 and 26. By combining a heating step and a mechanical step in the opening station, it is possible to open the shells without applying so much heat that the muscle is discoloured. This process further ensures that virtually all scallop shells will be open prior to passage from the opening station 14 into the first half shell removal station 16. As the carrier 30 enters the first half-shell removal station 16, the plow blade 40 extends between the two half-shells and deflects the first half-shell away from the second half-shell and discharges the bond between the first half-shell and the muscle. It will be noted that the mollusk seat 102 of the carrier is sufficiently low to permit the first half-shell to pivot away from the second half-shell during this opening operation. The opening operation will continue until the forward movement of the first half-shell is interrupted by engagement with the stop 42 whereupon the first half-shell will be wrenched away from the second half-shell and allowed to fall freely into a suitable shell collection receptacle. Thereafter, the second half-shell with the edible muscle and viscera attached, will enter the eviscerating station 18. In the eviscerating station 18, the eviscerating head is moved into and out of engagement with the second half-shell as previously described to separate the viscera from the edible muscle as the carriage 30 moves through the eviscerating station. Thereafter, the second half-shell with the edible muscle 46 attached, is driven through the heating section 20a wherein the infra-red heater 420 applies heat to the outer face of the second half-shell to relax the connection between the edible muscle and the second half-shell. Thereafter, the second half-shell with edible muscle attached enters the muscle removal section 20b wherein the muscle removal conduit is moved into an operative position extending into the second half-shell to surround the edible muscle and remove it from the second half-shell. Thereafter, the carrier 30 moves into the second half-shell discharge station 22 wherein the clamp is opened to release the second half-shell to permit it to fall freely from its associated carrier into a suitable collection receptacle and the carrier is washed and cooled immediately prior to being returned to the loading station.

From the foregoing, it will be apparent that the present invention provides a bivalve mollusk shucker which is capable of shucking bivalve mollusks and in particular scallops at high speed with a highly reliable operating mechanism.

Various modifications of the present invention will be apparent to those skilled in the art without departing from the scope of the invention. For example, while the mechanical shell opening mechanism which is located in section 14b is an efficient and effective mechanism, this mechanism may be replaced by a circular saw blade which may be used to cut through the first half-shell adjacent the hinge thereof to expose the edible muscle and viscera. This would also eliminate the requirement for the plow bar and arresting stop 42 is removed. These and other modifications of the present invention will be apparent to those skilled in the art.

The embodiments of the present invention in which an exclusive property or privilege is claimed are defined as follows:

1. A mollusk shucker for use in shucking bivalve mollusks which have two half-shell portions connected at a hinge end by an edible muscle, and each half-shell having a distal end remote from the hinge end, comprising:
   (a) a conveyor mounted for longitudinal movement in an endless path extending through a loading station, a shell opening station, a first half-shell removal station, an eviscerating station, an edible muscle removal station and a second half-shell discharge station,
   (b) a plurality of mollusk carriers mounted on said conveyor, said mollusk carriers have an inner side wall and a seat at one end of the inner side wall, said mollusk carriers being arranged to locate the seat at the lower end of the inner side wall and to position the inner side wall so that it extends in a direction parallel to the direction of longitudinal movement of the conveyor and is angularly inclined with respect to the vertical during movement of the conveyor through said loading and shell opening stations such that the inner side wall forms an inclined underlying support for supporting a second half-shell so that it opens laterally of the direction of longitudinal movement of the conveyor with its the hinge portion resting in said seat, each carrier having a central plane extending in the direction of movement of said conveyor along said endless path and being adapted to support a mollusk with its plane of shell separation aligned with said central plane,
   (c) shell opening means in said shell opening station,
   (d) first half-shell separation means in said first half-shell removal station for removing the first half-shell from its carrier,
   (e) eviscerating means in said eviscerating station for removing the inedible viscera from the second half-shell without removing the edible muscle,
   (f) edible muscle removal means in said edible muscle removal station adapted to remove the edible muscle from said sacond half-shell and,
   (g) release means in said second half-shell discharge station for discharging the second half-shell from its carrier.

2. A bivalve mollusk shucker as claimed in claim 1 wherein said eviscerating means comprises;
   an eviscerating head having a suction chamber,
   a viscera inlet tube projecting from said head, a viscera inlet passage opening from the suction chamber through said viscera inlet tube, the external dimensions of said viscera inlet tube being such as to permit it to project into the second half-shell and the internal dimensions of the inlet passage being such as to receive the muscle and viscera in a close fitting relationship, a viscera discharge passage opening from the suction chamber and communicating with a vacuum source to generate a negative pressure in said viscera inlet passage which serves to separate the viscera from the muscle, and,
   a water jet inlet opening into said viscera passage adapted to discharge a jet of water in a direction to impinge on the viscera and release it from the muscle in use,
   pressure relief valve means communicating with said suction chamber for limiting the negative pressure within said suction chamber to prevent removal of the muscle from the second half-shell,
   support means supporting said eviscerating head for movement with respect to successive mollusk carriers, said support means comprising;
   means for mounting said eviscerating head for movement between an operative position in which the eviscerating inlet passage is in communication with a second half-shell located in said eviscerating station to locate the viscera inlet passage in a position substantially enclosing the muscle and viscera and an inoperative position in which eviscerating inlet passage is out of engagement with the second half-shell.

3. A bivalve mollusk shucker as claimed in claim 2 wherein said water jet opening is located on a side of the viscera inlet passage remote from the viscera discharge passage and is arranged to discharge a jet of water across the viscera inlet passage in a direction towards the viscera discharge passage to impinge against the viscera at an angle with respect to the second half-shell so as to be directed away from the second half-shell to flush the viscera into the viscera discharge passage.

4. A bivalve mollusk shucker as claimed in claim 2 wherein the eviscerating means is mounted to reciprocate in the direction of said path between a first location and a second location, said eviscerating means being movable with each successive carrier as it is driven through said eviscerating station from said first location to said second location during removal of the viscera and returning from the second location to the first location after removal of the viscera to engage successive mollusks.

5. A bivalve mollusk shucker as claimed in claim 4 wherein said means for moving said eviscerating head comprises;
  (a) a carriage mounted to reciprocate longitudinally of said path between a retracted position and an advanced position,
  (b) an arm mounted on said carriage for pivotal movement about an axis extending parallel to said path, said arm projecting laterally from said carriage, said eviscerating head being mounted on said arm for movement with said arm between said operative and inoperative positions in response to movement of said arm about its pivotal connection with said carriage between a first position and a second position,
  (c) a cam follower mounted on said arm,
  (d) an eviscerator cam track extending longitudinally of said eviscerator station, said eviscerator cam track having a forward run along which the cam follower travels during movement of the carriage from the retracted position to the advanced position, said forward run being shaped to cause the eviscerator head to sequentially move to, remain in and move away from said operative position in response to movement along said forward operative position in response to movement along said forward run and a return run along which the cam follower maintains the eviscerator head in the inoperative position.

6. A bivalve mollusk shucker as claimed in claim 5 wherein said carriage is driven from said retracted position to said advanced position by driving engagement with said conveyor, said carriage being moved out of driving engagement with said conveyor when in said advanced position and having a return drive means operable to return the carriage from the advanced position to the retracted position out of engagement with the conveyor.

7. A mollusk shucker as claimed in claim 1 wherein said mollusk carriers each comprise;
  (a) a frame member mounted on said conveyor,
  (b) a seat formed in said frame member and opening outwardly therefrom for seating the hinge end of a bivalve mollusk,
  (c) a side wall member arranged to extend from the seat to be disposed in an outwardly overlying relationship with respect to a second half-shell of a mollusk seated in said seat in use,
  (d) a clamp having an inner jaw and an outer jaw defining an open mouth opening toward said seat, said clamp being slidably mounted with respect to said seat for movement between an open position in which the jaws are spaced from the seat a sufficient distance to be spaced outwardly from the distal ends of the half-shell of a mollusk seated in said seat and a closed position in which the distal end of the second half-shell of a mollusk is located within said open mouth to be retained in an open configuration with the inner jaw disposed between the distal ends of the two half-shells, and,
  (e) means for moving the clamp relative to said seat between said open and closed positions in response to movement of the carriers through said loading and opening stations so as to be open when in the loading station and to move to the closed position during movement through the opening station.

8. A mollusk shucker as claimed in claim 7 wherein the shell opening station includes a muscle relaxing section and second half-shell clamping section arranged in series and wherein said means for moving the clamp between the open and closed positions comprises a clamp actuator cam track which extends through the second half-shell discharge station, the loading station and a major portion of the opening station, and a cam follower mounted on said clamp for movement along said clamp actuator cam track, said clamp actuator cam track being shaped to cause the clamp to move to the open position as its associated carrier enters the second half-shell discharge station and to remain in the open position until it enters the second half-shell clamping section wherein it permits the clamping section to move to the closed position to clamp the second half-shell to hold it fast with respect to the carriage.

9. A mollusk shucker as claimed in claim 1 wherein said shell opening station includes a muscle relaxing section and a second shell clamping section, said shell opening means comprising;
  (a) heater means extending longitudinally through said muscle relaxing section, said heater means being adapted to heat each mollusk as it is driven to said muscle relaxing station to relax the muscle to facilitate opening of the half-shells about their hinge,
  (b) first and second suction conduits communicating with a vacuum source, said suction conduits having respectively, first and second intake ends disposed opposite one another in said shell opening section, one on either side of said carrier, said intake ends being adapted to suctionally retain a first and second half-shell respectively of a mollusk thereon in use,
  (c) first and second suction conduit mounting means mounting said first and second conduits respectively for movement of the intake ends thereof toward and away from one another between a closed position in which the intake ends are located sufficiently close to one another to sectionally engage the first and second half-shells of a closed mollusk and an open position in which the intake ends are spaced from one another a sufficient distance to cause the first and second half-shells which are sectionally engaged thereby to be located in an open position.

10. A mollusk shucker as claimed in claim 9 wherein said suction conduit mounting means comprises;
  (a) a carriage mounted to reciprocate longitudinally of said path between a retracted position and an advanced position,
  (b) a first arm pivotally mounted on said carriage for movement about a first axis extending parallel to said path, said first arm supporting said first suction conduit such that its first inlet end is movable toward engagement with a first half-shell supported in a carrier in use,
  (c) a second arm pivotally mounted on said carriage for pivotal movement about a second axis extending parallel to said path, said second arm supporting said second suction conduit with its second inlet end opening toward the shell opening station, said second arm being movable between an inner position to initially engage a second half shell and an outer position for moving the second half shell which is engaged thereby to an open position,
(d) cam follower means communicating with said arm such that movement of the cam follower means effects movement of said first arm between said inner and outer positions,
(e) a shell opening cam track extending longitudinally of said shell opening portion of said shell opening station, said shell opening cam track having a forward run along which the cam follower travels during movement of the carriage from the retracted position to the advanced position, said forward run being shaped to cause said first arm and its associated first suction conduit to sequentially move toward an away from said inner position to initially sectionally engage a first half-shell and thereafter move the first half-shell to an open position by causing it to pivot about its hinge connection in response to movement along the forward run of the cam and a return run along which the cam follower locates the first conduit in its outer position.

11. A bivalve mollusk shucker as claimed in claim 1 wherein said first half-shell separation means comprises a plow blade which extends longitudinally of said path and has a leading end extending into said shell opening station and a terminal end spaced a substantial distance from the leading end, said leading end of said plow blade being aligned with the plane of separation of a mollusk supported therein by a carrier in use to extend between the distal ends of the half-shells of an open mollusk in use, said plow blade being laterally inclined with respect to said plane of separation in a direction away from the path of travel of the second half-shells to engage and deflect each first half shell away from its associated second half-shell to a wide open position and separate the first half-shell from the muscle and stop means at the terminal end of said plow blade projecting laterally therefrom for arresting the movement of the first half-shell while permitting continued movement of the carrier and the second half-shell supported thereby to detach the first half-shell from the second half shell.

12. A bivalve mollusk shucker as claimed in claim 1 wherein said edible muscle removal means comprises a muscle suction conduit having a muscle inlet passage and support means supporting said muscle suction conduit for movement with respect to said carriers, said support means comprising means for mounting said muscle conduit for movement between an operative position in which the muscle inlet passage is in communication with a second half-shell located in said edible muscle removal station to locate the edible muscle inlet passage in a position substantially enclosing the muscle and an inoperative position in which the muscel inlet passage is out of engagement with the second half-shell.

13. A bivalve mollusk shucker as claimed in claim 12 wherein the edible muscle removal conduit is mounted to reciprocate in the direction of said path between a first location and a second location, said edible muscle removal conduit being movable with each successive carrier as it is driven through said edible muscle removal station from said first location to said second location during removal of the edible muscle and returning from the second location to the first location after removal of the edible muscle to engage a successive mollusk.

14. A mollusk shucker as claimed in claim 13 wherein said edible muscle removal means further comprises heater means extending longitudinally of said edible muscle removal station, said heater means being arranged to direct heat against the outer face of the second half-shells as they are driven through said edible muscle removal station to relax the edible muscle to facilitate its removal by said edible muscle suction conduit.

15. A mollusk shucker as claimed in claim 1 further comprising a second conveyor extending parallel to and coextensive with the first mentioned conveyor, a plurality of crossbar members extending transversely between and interconnecting said first mentioned conveyor and said second conveyor, said mollusk carriers being mounted on said crossbar members and arranged in two sets, first of said sets being located adjacent said first mentioned conveyor for movement along said first mentioned path and a second of said sets being located adjacent said second conveyor for movement along a second path which is coextensive with said first mentioned path and extends through said loading station, shell opening station, first half-shell removal station, eviscerating station, edible muscle removal station and second half-shell discharge station.

16. A mollusk shucker for use in shucking bivalve mollusks which have two half-shell portions connected at a hinge end by an edible muscle, and each half-shell having a distal end remote from the hinge end, comprising:
(a) a conveyor mounted for movement in an endless path extending through a loading station, a shell opening station, a first half-shell removal station, an eviscerating station, an edible muscle removal station and a second half-shell discharge station,
(b) a plurality of mollusk carriers mounted on said conveyor, each carrier a central plane extending in said endless path and being adapted to support a mollusk with its plane of shell separation aligned with said central plane,
(c) shell opening means in said shell opening station,
(d) first half-shell separation means in said first half-shell removal station for removing the first half-shell from its carrier,
(e) eviscerating means in said eviscerating station for removing the inedible viscera from the second half-shell without removing the edible muscle, said eviscerating means comprising;
(i) an eviscerating head having a suction chamber,
(ii) a viscera inlet passage opening from the suction chamber, a viscera discharge passage opening from the suction chamber and communicating with a vacuum source to generate a negative pressure in said viscera inlet passage which serves to separate the viscera from the muscle, and,
(iii) a water jet inlet opening into said viscera passage adapted to discharge a jet of water in a direction to impinge on the viscera and release it from the muscle in use,
(iv) pressure relief valve means communicating with said suction chamber for limiting the negative pressure within said suction chamber to prevent removal of the muscle from the second half-shell, (v) support reans supporting said eviscerating head for movement with respect to successive mollusk carriers, said support means comprising;
(vi) means for mounting said eviscerating head for movement between an operative position in which the eviscerating inlet passage is in communication with a second half-shell located in said eviscerating station to locate the viscera lnlet passage in a position substantially enclosing the muscle and viscera and an inoperative position in which eviscerating inlet passage is out of engagement with the second half-shell,
said eviscerating means being mounted to reciprocate in the direction of said path between a first location and a second location said eviscerating means being movable with each successive carrier as it is driven through said eviscerating station from said first location to said second location during removal of the viscera and returning from the second location to the first location after removal of the viscera to engage successive mollusks,
(f) edible muscle removal means in said edible muscle removal station adapted to remove the edible muscle from said second half-shell and,
(g) release means in said second half-shell discharge station for discharging the second half-shell from its carrier.

* * * * *